Dec. 5, 1939.　　　　　G. S. FROST　　　　　2,182,079
PIE TRIMMING MACHINE
Filed Jan. 24, 1938　　　2 Sheets-Sheet 1
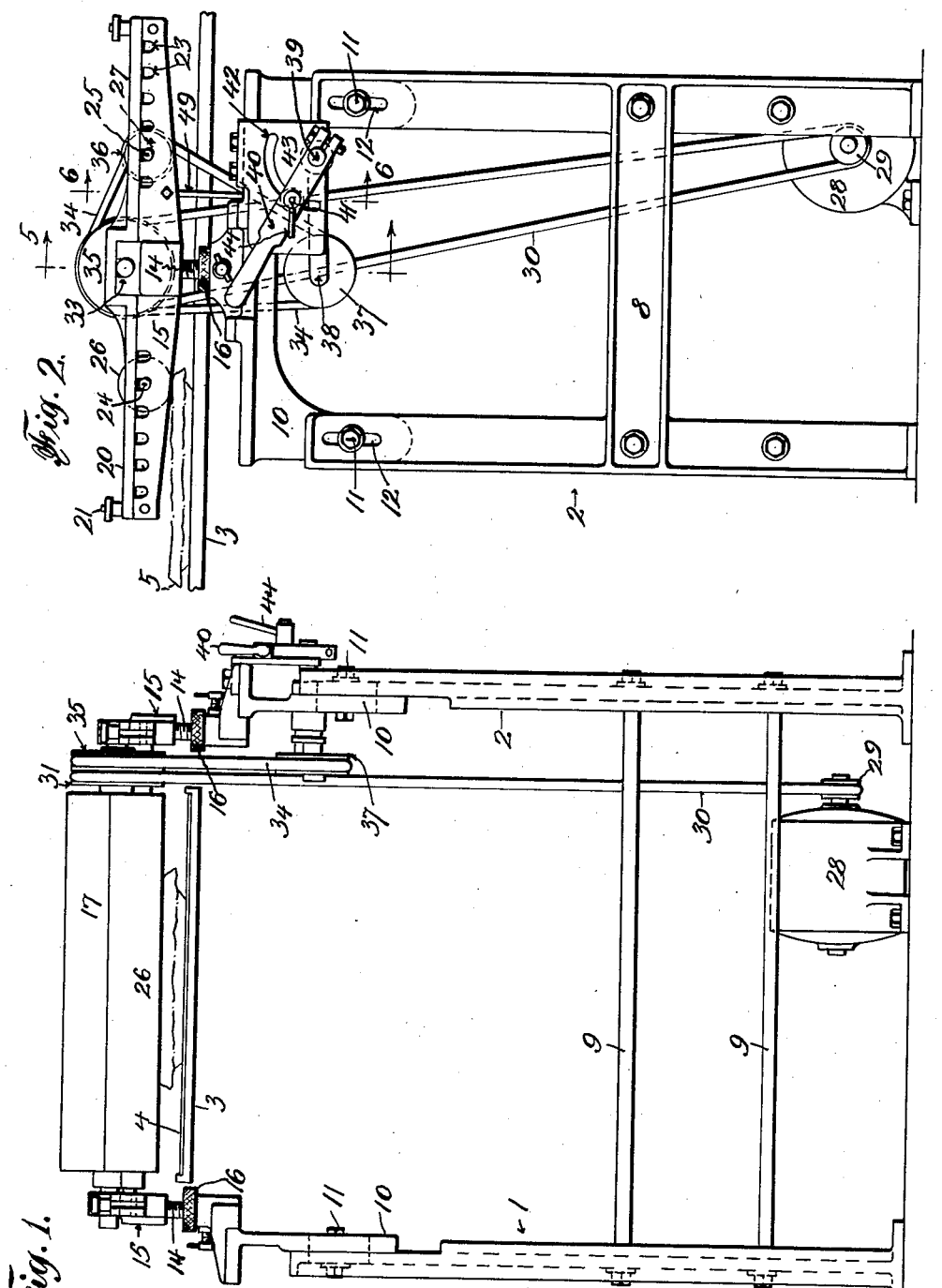
INVENTOR
George S. Frost, deceased,
by Theodore B. Frost, Exr.
Charles G. Hensley
ATTORNEY Dec. 5, 1939.　　　　G. S. FROST　　　　2,182,079
PIE TRIMMING MACHINE
Filed Jan. 24, 1938　　　2 Sheets-Sheet 2
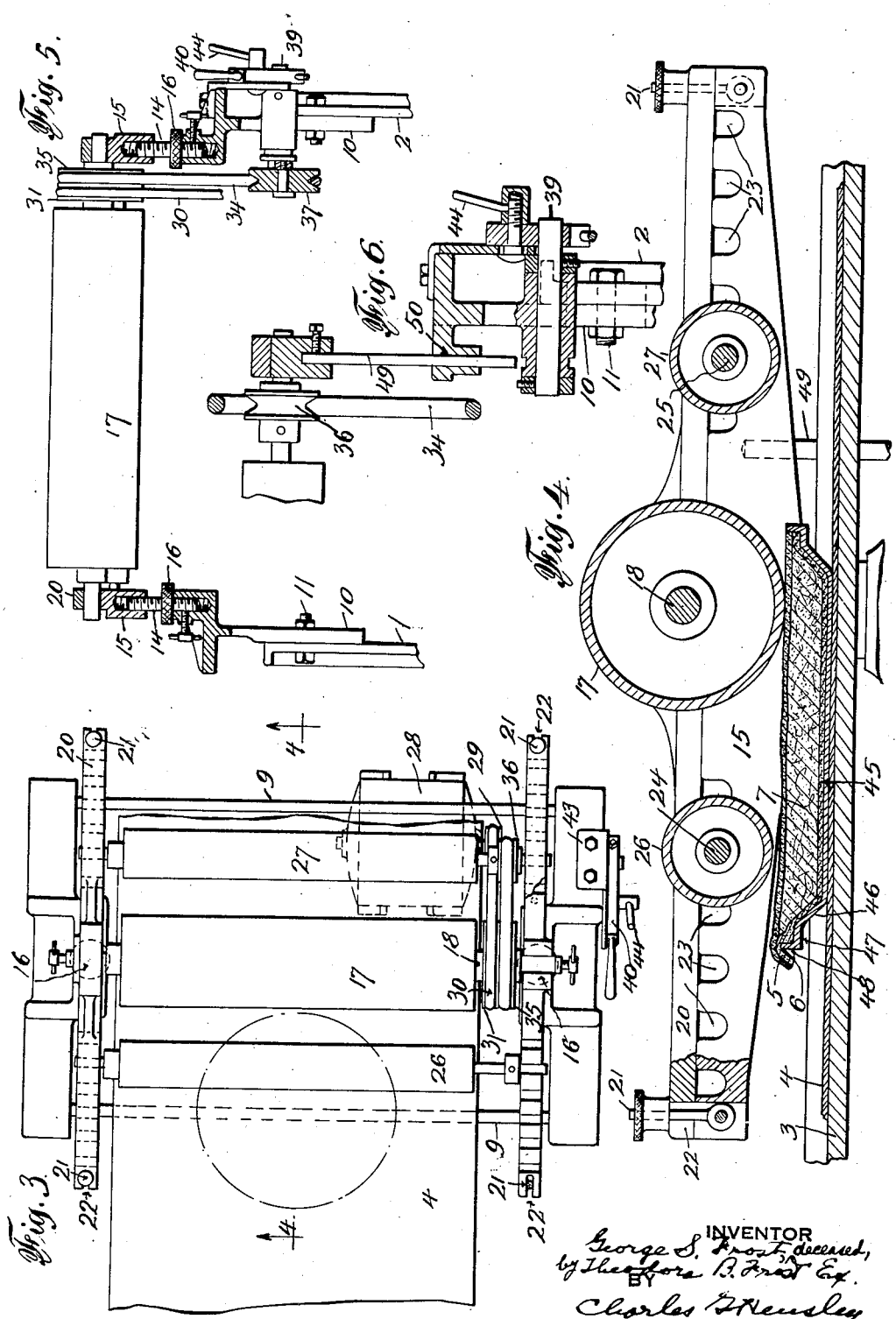
INVENTOR
George S. Frost, deceased,
by Theodore B. Frost Ex.
BY
Charles F. Hensley
ATTORNEY Patented Dec. 5, 1939

2,182,079

UNITED STATES PATENT OFFICE 2,182,079

PIE TRIMMING MACHINE

George S. Frost, deceased, late of Baldwin, N. Y., by Theodora B. Frost, executrix, Baldwin, N. Y.

Application January 24, 1938, Serial No. 186,613

9 Claims. (Cl. 107—1)

The present invention relates to a device for a machine for automatically trimming pies. In the patent issued to the said George S. Frost, deceased, No. 2,021,597, and dated November 19, 1935, there is shown a machine for automatically trimming pies, and the present invention relates to a machine for accomplishing the same general purpose as the machine shown in the aforesaid patent.

The object of the present invention is to provide a machine which will automatically trim the excess dough which is allowed to hang over the flange of a pie plate after the two layers of dough and the filler have been applied upon the pie plate. Prior to the invention of the machine shown in the aforesaid patent, it was customary to trim the dough around the edge of the plate by hand. With the present machine the dough is automatically trimmed around the edge of the plate as the plate is being conveyed along the bench or traveling belt, so that no hand work is involved in the trimming of the pies.

In the aforesaid patent there are rollers mounted on rocking levers which perform the trimming operation automatically and the object of the present invention is to provide a simpler, less expensive and more efficiently operating device for accomplishing the same result.

Under the present invention the rollers need not be mounted upon swinging levers, but have fixed positions, thereby eliminating most of the mechanism of the aforesaid machine. In the present case there is a main or trimming roller which rolls against the top edge of the plate, and there are rollers preceding and succeeding the trimming roller, the former of which normally does not contact the plate or the dough, but which is present to prevent the plate from tipping or tilting out of position when it first comes into contact with the trimming roller and the succeeding roller prevents the plate from tipping or tilting by engaging the plate as it is about to have contact with the trimming roller. These additional or guide rollers may be quickly shifted in position upon the frame of the machine so that they are in the right position for different size pie plates inasmuch as their location is determined by the size of the plates on which the trimming roller is acting. There are provided sockets for permitting quick positioning of these guiding rollers.

The construction as a whole is therefore much simpler than that shown in the aforesaid patent. Provision is made in the present machine for mounting it in relation to any traveling belts and tables now in use by permitting the frame to straddle such a table and belt, and by permitting the operating parts to be adjusted in height to correspond with the height of the conveyor belt which conveys the pie plates.

Other objects and advantages will be set forth in the following detailed description of the invention.

In the drawings forming part of this application,

Figure 1 is an end elevation of a machine embodying the invention,

Figure 2 is a side elevation thereof,

Figure 3 is a plan view of the machine,

Figure 4 is a sectional view on an enlarged scale, taken on the line 4—4 of Figure 3, Figure 5 is a sectional view taken on the line 5—5 of Figure 2, and Figure 6 is a sectional view taken on the line 6—6 of Figure 2.

The frame of the machine is shown as consisting principally of two upright standards 1, 2 spaced apart to straddle the table 3 over which the pie plates are conveyed by the traveling belt 4 from the point at which the dough 5 for the top crust has been applied. Usually in a pie bakery there is a long bench, such as 3, with a number of workers disposed in positions along the same, one or more workers first apply the dough 6 to form the bottom crust of the pie, then one or more fillers apply the filler 7 upon the bottom dough, and one or more operators apply the top layer of dough 5 to form the top crust of the pie. Both layers of dough extend more or less beyond the edge of the plate to be trimmed off in the trimming operation. As stated above, this trimming operation, prior to the aforesaid patent, was performed by hand, but this operation may now be performed automatically with the present machine.

The frame, in addition to the standards 1, 2 and the cross pieces 8 preferably consists of tie rods 9 which are bolted to the standards to retain them in definite spaced relation. Near the upper portions of these standards and on each side of the machine, there are mounted brackets 10 secured to the standards by bolts 11 engaging in elongated slots 12 which permit the brackets 10 to be adjusted in height. The vertical adjustment of the brackets 10 is to provide a rough adjustment of the trimming roller in relation to the plant of the table 3 and the belt 4.

Mounted upon threaded studs 14 there are two brackets 15 extending lengthwise of the machine and at each side of the belt 4. These brackets are also adjustable vertically by means of the nuts 16 which are threaded onto the studs 14 the latter being fixed to the brackets 15. By turning the nuts 16 the brackets 15 may be raised or lowered and this adjustment may be performed for securing more accurately the relation of the trimming roller to the belt 4. There is shown a trimming roller 17 mounted on a shaft 18 which has its bearings in the recesses 33 of the brackets 15 and the shaft is retained in these bearing sockets by means of a locking plate 20 which extends along the top of each bracket 15 and which is held in position by swinging bolts 21 which may swing into and out of the notches 22 in the clamping bar 20 and which serve to hold the bar tightly in place on the respective brackets 15.

At various positions along the brackets 15 there are recesses 23 into which the shafts 24, 25 of the two guide rollers 26, 27 are adapted to have their bearings, these rollers being disposed one in advance of and one following the trimming roller 17 in the direction of movement of the pies on the conveyor belt 4.

There are a number of recesses 23 for each of the rollers 26, 27 so that these rollers may be readily adjusted in different spaced relation to the trimming roller in accordance with the size of the pie plates being acted upon.

There is shown a motor 28 disposed on the floor and the pulley 29 on the shaft of this motor drives a belt 30 which is endless and which passes around a pulley 31 on the shaft 18 which carries the trimming roller so that the trimming roller is revolved preferably at a surface speed corresponding with the speed of travel of the pie plates on the belt 4. Preferably, the guide roller 26 is an idler, in other words, it is not driven. The guide roller 27, however, is preferably driven in the following manner: There is a belt 34 which engages partly around a pulley 35 which is also mounted on the shaft 18 which carries the trimming roller. This belt also travels around a pulley 36 mounted on the shaft 25 which carries the guide roller 27 so that since the trimming roller is driven through the belt 30 from the motor, the motion is transmitted through the belt 34 to the guide roller 27 and the pulleys are preferably so proportioned that the surface speed of the guide roller 27 will be the same as that of the trimming roller.

There is shown a rod 49 attached to each bracket 15 and extending into apertures 50 in the brackets 10 which serve to keep the brackets 15 in their proper alignment and prevent their turning when the nuts 16 are turned.

The belt tightener pulley 37 is mounted on a swinging arm 38 which pivots from the stud 39 is adapted to be adjusted in position by the lever arm 40 which is fixed to the stud 39. This lever arm has a pin 41 travelling in the arcuate slot 42 of the plate 43 mounted on the frame of the machine; and the lever is adapted to be locked in various positions by the locking member 44. The belt 34 passes around the pulleys 35, 36 and also passes partly around the tightening roller 37. It will be obvious that by adjusting the position of the tightening roller 37 proper tension may be placed upon the belt 34 to secure the necessary traction for the operation of the pulleys.

In Figure 4 there is shown the type of plate which is preferably used in conjunction with the present invention. This plate has a bottom wall 45 together with the usual frusto conical wall 46 extending upwardly from the bottom wall and at the upper portion of the frusto conical wall there is a horizontal portion 47 and from the outer extremity of this there is a small vertically projecting flange 48. The trimming roller co-operates with this flange 48 by rolling against its top edge to trim off the excess dough which extends over the flange of the plate.

In Figure 4 the right side of the plate shows the condition after the trimming roller has progressed partly across the flange 48 whereas the left side of the plate shows the overhanging dough in the condition preceding the trimming of this portion.

The trimming roller 17 is placed at such a position in relation to the traveling belt 4 either by the adjustment of the height of the brackets 10 or by adjusting the height of the brackets 15 through the nuts 16 or by both of these adjustments, so that the bottom of the trimming roller will be at such a height from the top surface of the belt 4 that the trimming roller will touch the top edge of the flange 48 of the plate as the plate is carried from left to right in Figure 4. Where this adjustment is properly made it is not necessary for the trimming roller to have any up and down movement during the trimming operation of the machine because the pie plates are rather accurately made and therefore the height of the top edge of the flange 48 above the upper surface of the belt 4 will be practically uniform for all plates of a given size.

It will be noted that the roller 26 under which the pie and plate first travel in approaching the trimming roller is so positioned in relation to the belt 4 that as long as the pie plate remains flat upon the belt 4 neither the plate nor the dough will come into contact with the roller 26. When the leading portion of the plate first passes into contact with the trimming roller there may be a tendency for the plate to tilt because the leading portion of the flange 48 extends beyond the right hand end of the bottom 45 of the plate. When there is a tendency for the plate to tilt because of this action the plate will be prevented from tilting excessively by the controlling roller 26.

After the plate has partly passed under the trimming roller, however, the tendency of the plate to tilt will have ceased and if it has partly tilted into contact with the roller 26 it will return again to a flat position on the belt 4. There will be no more tendency for the plate to tilt until it has nearly passed under the trimming roller; but when the latter is engaging that portion of the flange of the plate which overhangs, that is, when the plate has nearly completed its path under the trimming roller there may be a tendency for the plate to tilt upwardly at its leading side but this will be prevented by the roller 27 which touches the plate when the overhanging portion at the rear is under the trimming roller and thus the tilting of the plate at the forward end will be prevented by the roller 27. Inasmuch as the roller 27 engages the plate subsequent to the trimming operation by the trimming roller, this guide roller may be normally in contact with the plate flange and it may be revolved as previously described herein in order to more or less propel the plate in conjunction with the belt 4 to remove it entirely from the trimming roller.

The plates will travel along on top of the belt 4 either in single file or side by side, and they will first pass under the roller 26 during which time no action takes place on the pie or plate. Thence, the plate travels under the trimming roller and as explained above if the plate tends to tilt upwardly at the rear end, excessive tilting is prevented by the roller 26. After passing the trimming roller the plate travels under the roller 27 which preferably rides against the top edge of the flange 48 of the plate and if there is any tendency of the plate to tilt upwardly at its leading portion due to the action of the trimming roller, such tilting is prevented or limited by the roller 27. If this roller is driven, as described herein, it assists the belt 4 in carrying the plates beyond the trimming roller.

The shaft 18 of the roller 17 will have a little play in the bearing apertures 33 to prevent the roller binding on the plate and to allow the roller 17 to rest on the flange 48 of the plate of its own weight. The shafts 24 and 25 of the rollers 26 and 27 also have a slight vertical play in the slots 23 to prevent binding of the plates while passing under these rollers.

If different size plates are to be conveyed on the belt 4 it may be necessary to raise or lower the brackets 15 to adjust the trimming roller as well as the guide rollers to accord with the change of depth of the plates. This may be done either by raising or lowering the brackets 19 or by raising or lowering the brackets 15. Preferably the brackets 10 are raised or lowered to secure a rough adjustment of the rollers in relation to the belt 4, and then the nuts 16 are turned to secure a fine adjustment of the rollers in relation to the belt 4.

When small size plates, that is, plates of small diameter, are being trimmed, the shafts 24, 25 of the rollers 26, 27 are positioned in the apertures 23 nearest the trimming roller. This is so that these rollers will act on the smaller size plates while they are engaged with the trimming roller. If larger plates are being acted upon, then the shafts 24, 25 of the rollers 26, 27 will be placed in other grooves 23 farther from the trimming roller to correspond with the plates of larger diameter. This positioning of the guide rollers is done to have these rollers so related to the trimming roller that they will act on the plates only where they are subject to a tilting action by the trimming roller. The lever arm 40 may be adjusted to change the position of the belt tightener 37 when the guide roller 27 is shifted in position. While the preferred construction of the invention has been described herein it is not intended to limit the invention to the specific embodiment described but to cover all modifications thereof coming within the scope of the following claims.

Having described the invention, what is claimed is:

1. In a machine for trimming pies, including a support along which pie plates are conveyed, fixed supports extending longitudinally of the opposite sides and above said support, a roller rotatably mounted on said supports intermediate the ends thereof and arranged in relation to the support as to roll against the flanges of pie plates as they are moved along the support to trim the dough around the same, a guide roller rotatably mounted on said supports in advance of said trimming roller arranged to be normally out of contact with pie plates conveyed along the support and adapted to be engaged by and prevent excessive tilting of the pie plates while acted upon by said trimming roller, and a guide roller rotatably mounted on said supports at the following side of the trimming roller to be engaged by and prevent excessive tilting of the pie plates while acted upon by said trimming roller.

2. In a machine for trimming pies including a support and a conveyer to convey pie plates along the support, a bracket fixedly mounted at each side of the support to extend longitudinally of transverse recesses extended into the upper edge and above the support, and said brackets having and spaced longitudinally thereof, a roller rotatably mounted on said brackets at one end of said recesses to extend transversely of the support and arranged in relation to pie plates transported on the conveyer along the support to roll against the plate flange and trim the dough around the edge of the plate, and a roller adapted to be rotatably mounted in any of the recesses in said brackets in spaced advanced relation to said trimming roller and spaced from the conveyer a distance greater than the height of the pie plates, and said roller adapted to be engaged by a pie plate that may be tilted as it passes below the trimming roller and prevent excessive tilting of the pie plate on the conveyer while it is acted upon by said trimming roller.

3. In a machine for trimming pies including a support and a conveyer to transport plates along the support, a bracket fixedly mounted and extending longitudinally above each side of the support, said brackets having transverse recesses extended into the upper edge and space from intermediate the ends to the ends of the brackets, a roller mounted on said brackets at one side of said recesses to rotate on an axis extending transversely of the support and arranged in relation to pie plates on the conveyer transported along the support to engage and roll against the plate flange and trim the dough around the same, and a roller supported in any one of the recesses of said brackets in advance of the trimming roller and have movement toward and away from the support, said roller being spaced from the conveyer a greater distance than said trimming roller to be normally out of contact with the dough on the pie plate transported along the support by the conveyer and adapted to be engaged by a pie plate that is tilted as it passes below the trimming roller and prevent excessive tilting of the pie plate while it is acted upon by the trimming roller.

4. In a machine for trimming pies including a support and a conveyer to convey pie plates along the support, brackets fixedly mounted at the opposite sides of the support to extend longitudinally of and above the support, a roller rotatably mounted on said brackets to extend transversely of the support and arranged in relation to the pie plates transported along the support to roll against the pie plate flange and trim the dough around the edge of the plate, a roller adapted to be rotatably mounted on said brackets in advance of said trimming roller and spaced from the conveyer a distance greater than the height of the pie plates and said roller adapted to be engaged by a pie plate that may be tilted as it passes below the trimming roller and prevent excessive tilting of the pie plate on the conveyer while it is acted upon by said trimming roller, a roller following the trimming roller rotatably supported by the brackets and spaced from the support a distance greater than the depth of the pie plates, and said roller adapted to be engaged by a pie plate that may be tilted and prevent undue tilting of the pie plate as it passes from below the trimming roller.

5. In a machine for trimming pies including a support and a conveyer to transport plates along the support, a bracket mounted at and extending longitudinally above each side of the support, a roller mounted on said brackets to rotate on an axis extending transversely of the support and arranged in relation to pie plates on the conveyer transported along the support to engage and roll against the pie flange and trim the dough around the same, a roller supported on said brackets in advance of the trimming roller and to have movement toward and away from the support, said roller being spaced from the conveyer a greater distance than said trimming roller to be normally out of contact with the dough on the pie plate transported along the support by the conveyer and engaged by a pie plate that is tilted as it passes below the trimming roller and prevent excessive tilting of the pie plate while it is acted upon by the trimming roller, a roller following the trimming roller rotatably mounted on said brackets and to have movement toward and away from the support, and said roller spaced from the support a distance greater than the depth of the pie plate and engage a pie plate by gravity that is tilted as it passes from below the trimming roller to prevent excessive tilting of the pie plate while it is acted upon by the trimming roller.

6. In a machine for trimming pies including a support and a conveyer to convey pie plates along the support, brackets fixedly mounted at the opposite sides of the support to extend longitudinally of and above the support, a roller rotatably mounted on said brackets to extend transversely of the support and arranged in relation to the pie plates transported along the support to roll against the pie plate flange and trim the dough around the edge of the plate, a roller adapted to be rotatably mounted on said brackets in advance of said trimming roller and spaced from the conveyer a distance greater than the height of the pie plates and said roller adapted to be engaged by a pie plate that may be tilted as it passes below the trimming roller and prevent excessive tilting of the pie plate on the conveyer while it is acted upon by said trimming roller, a roller following the trimming roller rotatably supported by the brackets and spaced from the support a distance greater than the depth of the pie plates, and said roller adapted to be engaged by a pie plate that may be tilted and prevent undue tilting of the pie plate as it passes from below the trimming roller, and means to positively rotate the trimming and following rollers.

7. In a machine for trimming pies, including a support along which pie plates are conveyed, fixed brackets extending longitudinally of the opposite sides and above the support, a roller rotatably mounted on and extending between the brackets transversely of the support and arranged in relation to the support as to roll against the flange of the pie plate conveyed along the support to trim the dough around the pie plate flange, guide rollers rotatably mounted on said brackets one in advance of and the other following the trimming roller arranged to be normally out of contact with pie plates conveyed along the support and be engaged by pie plates as they are acted upon by the trimming rollers to prevent undue tilting of the pie plates, and means for rotating the trimming roller and guide roller following the trimming roller.

8. A machine for trimming pies, including a support along which pie plates are conveyed, fixed brackets extending longitudinally of the opposite sides and above the support, a roller rotatably mounted on said brackets to extend transversely of and arranged in relation to the support to roll against the flanges of pie plates conveyed along the support to trim the dough around the same, guide rollers mounted on said brackets to rotate on axes parallelly of the trimming roller and acting in advance of and following said trimming roller to prevent excessive tilting of the plates while they are acted upon by the trimming roller, each of said brackets having a plurality of recesses spaced along the same at opposite sides of the trimming roller adapted for the removable mounting of the shafts of the guide rollers therein, and to permit said guide rollers to be mounted on the brackets at relatively different distances from said trimming roller.

9. In a machine for trimming pies as claimed in claim 8, means for mounting the brackets on the support to have adjustment toward and away from the support.

THEODORA B. FROST,
*Executrix of the Estate of George S. Frost, Deceased.*